US008870695B2

(12) United States Patent
Nishimi et al.

(10) Patent No.: US 8,870,695 B2
(45) Date of Patent: Oct. 28, 2014

(54) TRANSMISSION BELT (75) Inventors: Hideyuki Nishimi, Nisshin (JP); Daisuke Kobayashi, Mishima (JP); Shinya Kuwabara, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 84 days.

(21) Appl. No.: 13/510,804

(22) PCT Filed: Nov. 19, 2009

(86) PCT No.: PCT/JP2009/069647
§ 371 (c)(1), (2), (4) Date: May 18, 2012

(87) PCT Pub. No.: WO2011/061834
PCT Pub. Date: May 26, 2011

(65) Prior Publication Data
US 2012/0231910 A1    Sep. 13, 2012

(51) Int. Cl.
- *F16G 1/21* (2006.01)
- *F16G 1/22* (2006.01)
- *F16G 5/16* (2006.01)

(52) U.S. Cl.
CPC ........................ *F16G 5/16* (2013.01)
USPC ....................................................... 474/242

(58) Field of Classification Search
CPC ................ F16G 1/00; F16G 5/16; F16H 9/24
USPC ................................................ 474/242, 244
See application file for complete search history.

(56) References Cited

U.S. PATENT DOCUMENTS 3,720,113 A * 3/1973 Doorne et al. ................ 474/242
(Continued)

FOREIGN PATENT DOCUMENTS

DE    69925283    1/2006
(Continued)

OTHER PUBLICATIONS

International Search Report Issued Feb. 16, 2010 in PCT/JP09/69647 Filed Nov. 19, 2009.

*Primary Examiner* — Henry Liu
(74) *Attorney, Agent, or Firm* — Oblon, Spivak, McClelland, Maier & Neustadt, L.L.P.

(57) ABSTRACT

A transmission belt includes: an endless annular hoop formed by overlapping a plurality of thin strip-shaped rings; and a multiplicity of elements supported by the hoop in an annularly arranged state along the hoop, the elements including a saddle surface pressed against an inner circumferential surface of a first ring located at the innermost circumference of the hoop, the transmission belt wound between a plurality of pulleys to transmit power and having a shape in the width direction of the first ring elastically deformed in accordance with the saddle surface in a pressed state while the inner circumferential surface of the first ring is pressed against the saddle surface, wherein the saddle surface is curved as a whole such that a center portion in the width direction bulges out, and wherein a degree of bulging-out of the center portion is smaller as compared to a degree of bulging-out of peripheral portions on the both sides, and the first ring is formed into a curved shape with a center portion in the width direction bulging out toward the outside in a natural state, and when both side portions in the width direction are brought into close contact with the peripheral portions of the saddle surface in a pressed state, the first ring is turned into a curved shape as a whole such that a center portion in the width direction bulges out in accordance with the shapes of the peripheral portions, and wherein the pressing load against the saddle surface is reduced in the center portion in the width direction or a gap is formed.

4 Claims, 7 Drawing Sheets

(56) References Cited

U.S. PATENT DOCUMENTS

| | | | | |
|---|---|---|---|---|
| 4,281,483 | A * | 8/1981 | Horowitz et al. | 451/59 |
| 4,303,403 | A * | 12/1981 | Lamers | 474/201 |
| 4,386,921 | A * | 6/1983 | Roberts | 474/201 |
| 4,526,559 | A * | 7/1985 | Smirl | 474/201 |
| 4,533,342 | A * | 8/1985 | Miranti et al. | 474/201 |
| 4,579,549 | A * | 4/1986 | Okawa et al. | 474/242 |
| 4,610,648 | A * | 9/1986 | Miranti, Jr. | 474/242 |
| 4,617,007 | A * | 10/1986 | Miranti et al. | 474/201 |
| 4,619,634 | A * | 10/1986 | Nakawaki | 474/201 |
| 4,676,768 | A * | 6/1987 | Miranti et al. | 474/201 |
| 4,826,473 | A * | 5/1989 | Miyawaki | 474/240 |
| 4,976,663 | A * | 12/1990 | Hendrikus | 474/242 |
| 5,011,461 | A * | 4/1991 | Brouwers | 474/188 |
| 5,123,879 | A * | 6/1992 | Lecouturier et al. | 474/242 |
| 5,152,722 | A * | 10/1992 | Yamada | 474/240 |
| 5,346,440 | A * | 9/1994 | Smeets | 474/242 |
| 6,109,393 | A * | 8/2000 | Toyota et al. | 184/6.12 |
| 6,273,837 | B1 * | 8/2001 | Yoshida et al. | 474/242 |
| 6,464,606 | B2 * | 10/2002 | Brandsma et al. | 474/242 |
| 6,468,174 | B1 * | 10/2002 | Brandsma et al. | 474/242 |
| 6,612,954 | B2 * | 9/2003 | Akagi et al. | 474/242 |
| 6,705,963 | B2 * | 3/2004 | Smeets et al. | 474/242 |
| 6,821,224 | B2 * | 11/2004 | Van Dijnsen et al. | 474/242 |
| 6,830,525 | B1 * | 12/2004 | Brandsma et al. | 474/242 |
| 6,832,967 | B2 * | 12/2004 | Kanokogi et al. | 474/242 |
| 6,896,633 | B2 * | 5/2005 | Kanehara | 474/242 |
| 7,013,691 | B2 * | 3/2006 | Shimoda | 72/110 |
| 7,066,858 | B2 * | 6/2006 | Smeets | 474/242 |
| 7,066,859 | B2 * | 6/2006 | Brandsma et al. | 474/242 |
| 7,108,624 | B2 * | 9/2006 | Smeets et al. | 474/201 |
| 7,294,077 | B2 * | 11/2007 | Wang et al. | 474/201 |
| 2002/0132691 | A1 * | 9/2002 | Pennings et al. | 474/242 |
| 2003/0004024 | A1 * | 1/2003 | Van Dijnsen et al. | 474/242 |
| 2005/0144899 | A1 * | 7/2005 | Tran et al. | 52/749.1 |
| 2007/0072721 | A1 * | 3/2007 | Takagi et al. | 474/242 |

FOREIGN PATENT DOCUMENTS

| | | |
|---|---|---|
| DE | 60113616 | 3/2006 |
| EP | 1 544 502 | 6/2005 |
| JP | 59 17350 | 2/1984 |
| JP | 61 162636 | 10/1986 |
| JP | 5 19704 | 3/1993 |
| JP | 2002-168305 | 6/2002 |
| JP | 2003 269547 | 9/2003 |
| WO | 2005 019684 | 3/2005 |
| WO | 2007/013797 | 2/2007 |
| WO | 2009/082196 | 7/2009 |

* cited by examiner

RELATED ART

FIG.7

TRANSMISSION BELT

TECHNICAL FIELD

The present invention relates to improvement of a transmission belt consisting of an endless annular hoop formed by overlapping a plurality of thin strip-shaped rings and a multiplicity of elements supported by the hoop in an annularly arranged state along the hoop.

BACKGROUND ART

For example, for a belt-type continuously variable transmission etc., with pulleys having a varying belt winding diameter (V-groove width), a transmission belt is used that has (a) an endless annular hoop formed by overlapping a plurality of thin strip-shaped rings and (b) a multiplicity of elements supported by the hoop in an annularly arranged state along the hoop, the elements including a saddle surface pressed against an inner circumferential surface of a first ring located at the innermost circumference of the hoop, and (c) the transmission belt is wound between a plurality of pulleys to transmit power and has a shape in the width direction of the first ring elastically deformed in accordance with the saddle surface in a pressed state while the inner circumferential surface of the first ring is pressed against the saddle surface. A transmission belt described in Patent Document 1 is an example thereof and the saddle surface forms a curved shape with a center portion in the width direction protruded outward, and the first ring is elastically deformed in accordance with the curved shape of the saddle surface in the pressed state such that the inner circumferential surface thereof is brought into close contact with the saddle surface across substantially the entire area in the width direction.

In this description, the width direction of the saddle surface is defined as the direction same as the width direction of the first ring of a thin strip shape.

Figure 6:
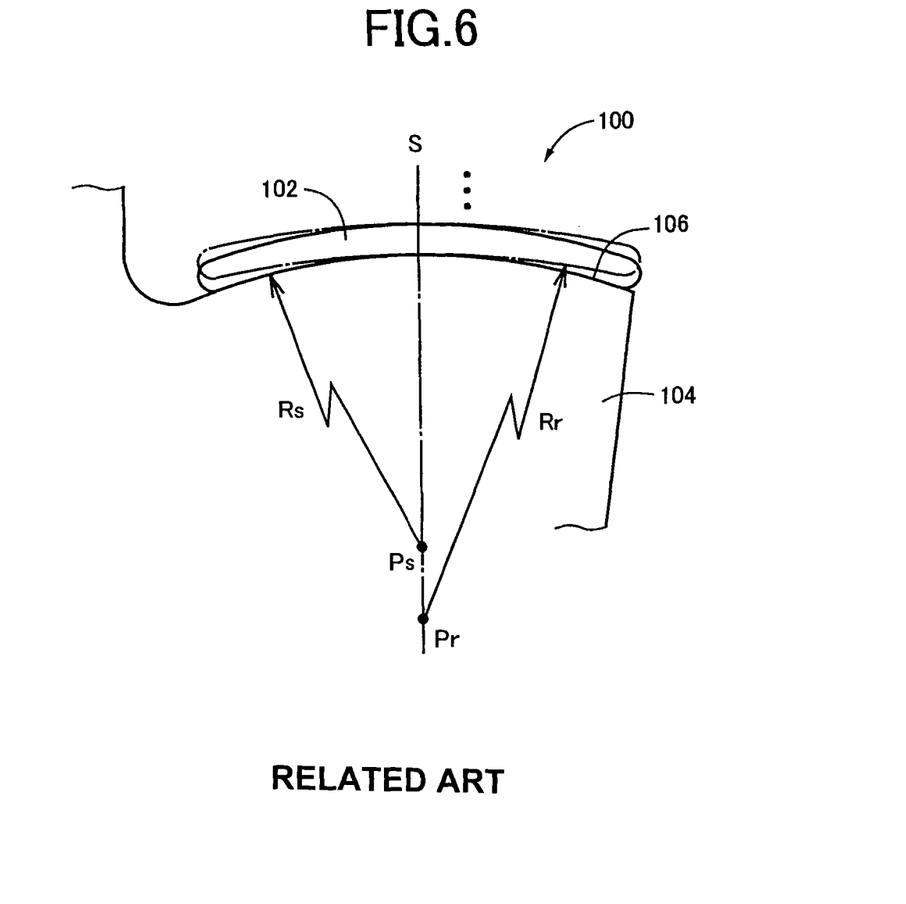
FIG. 6 is a cross-sectional view corresponding to FIG. 3(a) for explaining an example of a conventional transmission belt.
Figure 7:
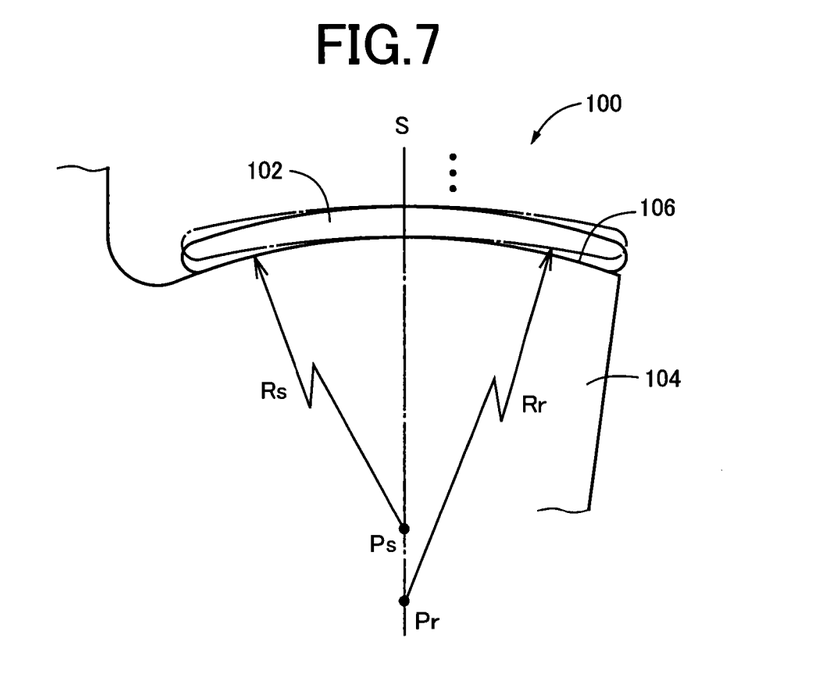

FIG. 6 is a diagram for explaining an example of such a conventional transmission belt, i.e., a schematic of an engagement state between a first ring 102 located at the innermost circumference of a hoop 100 and a saddle surface 106 of an element 104, depicting a cross-sectional shape in the width direction of the first ring 102 of a thin strip shape. The saddle surface 106 forms a curved shape with a center portion gently bulging out into a protruded shape toward the outside, i.e., the outer circumferential side (upside of FIG. 6) with a curvature radius Rs around a curvature center Ps on a center line S defined at substantially the center in the width direction. Although the first ring 102 forms a curved shape with a center portion gently bulging out into a protruded shape toward the outside with a curvature radius Rr greater than the curvature radius Rs as indicated by a dashed-dotted line in a natural state, a portion wound around a pulley is pressed against the saddle surface 106 due to tension and is therefore elastically deformed in accordance with the curved shape of the saddle surface 106 as indicated by a solid line and the inner circumferential surface is brought into close contact with the saddle surface 106 across substantially the entire area in the width direction. The first ring 102 is automatically adjusted to a position in the width direction such that a curvature center Pr is substantially positioned on the center line S of the saddle surface 106. Since FIG. 6 wholly depicts a cross-section, hatching (diagonal lines) indicative of a cross-section is not depicted.

PRIOR ART DOCUMENT

Patent Document

Patent Document 1: Japanese Laid-Open Patent Publication No. 2003-269547

SUMMARY OF THE INVENTION

Problem to be Solved by the Invention

However, since such a conventional transmission belt has the curvature radius Rr of the first ring greater than the curvature radius Rs of the saddle surface in the natural state, a load intensively acts on the center portion of the first ring, which is pressed against the saddle surface in the pressed state, and the center portion tends to suffer from insufficient lubrication and may cause abrasion and seizure. If a large amount of lubrication oil is sprayed to prevent the insufficient lubrication, performance of an oil pump must be improved, deteriorating efficiency.

The present invention was conceived in view of the situations and it is therefore an object of the present invention to improve lubrication performance between the center portion in the width direction of the inner circumferential surface of the first ring located at the innermost circumference of the hoop and the saddle surface.

Means for Achieving the Object

The second aspect of the invention is a transmission belt including: (a) an endless annular hoop formed by overlapping a plurality of thin strip-shaped rings; and (b) a multiplicity of elements supported by the hoop in an annularly arranged state along the hoop, the elements including a saddle surface pressed against an inner circumferential surface of a first ring located at the innermost circumference of the hoop, (c) the transmission belt wound between a plurality of pulleys to transmit power and having a shape in the width direction of the first ring elastically deformed in accordance with the saddle surface in a pressed state while the inner circumferential surface of the first ring is pressed against the saddle surface, wherein (d) the saddle surface is curved as a whole such that a center portion in the width direction bulges out, and wherein a degree of bulging-out of the center portion is smaller as compared to a degree of bulging-out of peripheral portions on the both sides, and (e) the first ring is formed into a curved shape with a center portion in the width direction bulging out toward the outside in a natural state, and when both side portions in the width direction are brought into close contact with the peripheral portions of the saddle surface in the pressed state, the first ring is turned into a curved shape as a whole such that a center portion in the width direction bulges out in accordance with the shapes of the peripheral portions, and wherein the pressing load against the saddle surface is reduced in the center portion in the width direction or a gap is formed.

The third aspect of the invention is the transmission belt of the second aspect of the invention, wherein the peripheral portions of the saddle surface are curved at a predetermined curvature, and wherein the center portion has a curvature smaller than the curvature of the peripheral portions.

The "curvature" may be replaced by the "curvature radius", and that the curvature of the center portion is smaller than the curvature of the peripheral portions means that the curvature radius Rs1 of the center portion is larger than the curvature radius Rs2 of the peripheral portions.

The fourth aspect of the invention is the transmission belt of the second or third aspect of the invention, and wherein a gap is formed from the saddle surface in the center portion in the width direction.

The fifth aspect of the invention is the transmission belt of any one of the second to fourth aspect of the invention, wherein the degree of bulging-out of the center portion of the saddle surface is zero and forms a linear shape in the width direction.

That the degree of bulging-out is zero means the same fact that the curvature radius Rs1 of the center portion equals to ∞ (infinite).

Advantages of the Invention

In the second invention, the saddle surface is curved as a whole such that a center portion in the width direction bulges out, and wherein a degree (such as the curvature of the circular arc or the inclination angle of the straight line) of bulging-out of the center portion is smaller as compared to a degree of bulging-out of peripheral portions on the both sides. In a state that the inner circumferential surface of the first ring is pressed against the saddle surface, the both side portions in the width direction of the first ring are elastically deformed to be in close contact with the peripheral portions of the saddle surface such that a curved shape is formed with the center portion in the width direction bulging out as a whole, and, accordingly, the pressing load against the saddle surface is reduced in the center portion or a gap is created. That is, the degree of bulging-out of the center portion of the first ring is made larger than the degree of bulging-out of the center portion of the saddle surface. As shown in the fourth aspect of the invention, since the gap is formed in the center portion between the first ring and the saddle surface, the gap retains the lubrication oil, the lubrication performance in the center portion is improved, thereby suppressing abrasion and seizure. As a result, the durability of the transmission belt is improved or an amount of the supplied lubrication oil can be reduced, thereby reducing the performance necessary for an oil pump and improving the efficiency. Although a pressing load is increased as compared to the conventional case in the peripheral portions (the both sides of the first ring) other than the central portion in which the gap is formed, since the first ring is substantially uniformly brought into close contact due to the elastic deformation in the peripheral portions and the load is broadly distributed, the load is not concentrated as in the case of the center portion of the conventional apparatus and, since the lubrication oil retained in the gap of the center portion favorably lubricates the peripheral portions, the lubrication performance is comprehensively improved, thereby suppressing abrasion and seizure.

On the other hand, depending on a degree of bulging-out of the center portion of the saddle surface, the center portion in the width direction of the first ring also substantially contacts the center portion of the saddle surface and the definite gap may not be formed therebetween, however, since the center portion of the saddle surface has the degree of bulging-out smaller than that of the peripheral portions, the pressing load is reduced even if the gap is not formed. Therefore, as compared to the conventional case of the load intensively acting on the center portion, the lubrication performance in the center portion is improved, thereby suppressing abrasion and seizure. Although the pressing load is increased in the peripheral portions other than the central portion, since the first ring is substantially uniformly brought into close contact due to the elastic deformation in the peripheral portions and the load is broadly distributed, the action of the load is not concentrated as in the conventional center portion and predetermined lubrication performance is acquired in the peripheral portions, thereby comprehensively improving the lubrication performance as compared to the conventional case.

In the fifth aspect of the invention, the degree of bulging-out of the center portion of the saddle surface is zero and forms a linear shape in the width direction. Consequently, a relatively large gap is formed from the inner circumferential surface of the first ring and the gap retains the lubrication oil, thereby achieving more favorable lubrication performance.

MODES FOR CARRYING OUT THE INVENTION

Although the present invention is preferably applied to a transmission belt used in a belt-type continuously variable transmission for a vehicle, the present invention is applicable to various transmission belts such as a belt-type continuously variable transmission for other than vehicle, a transmission belt wound and used between a pair of pulleys with a constant gear ratio, and a transmission belt wound and used around three or more pulleys.

Although an element has a pair of recessed grooves symmetrically disposed in a lateral direction for receiving hoops, for example, and is configured such that the recessed grooves receive respective hoops and that side walls on the lower side of the recessed grooves (the inner circumferential side of the hoops) act as saddle surfaces, various forms are available such as having only one recessed groove for receiving a single hoop.

In the second aspect of the invention, the saddle surface is curved as a whole such that the center portion in the width direction bulges out, and the degree of bulging-out of the center portion is made smaller than the degree of bulging-out of the peripheral portions by the curvature radius Rs1 of the center portion set to ∞ (infinity), for example; however, the curvature radius Rs1 may be set to a finite value larger than a curvature radius Rs2 of the peripheral portions. The curvature of the center portion can be set to negative curvature (recessed) relative to the curvature of the peripheral portions.

The degrees of bulging-out (such as the curvature radius Rs2) of the peripheral portions located on the both sides of the center portion may be the same as each other or may be set to different levels from each other. The degrees of bulging-out such as the curvature radiuses Rs1, Rs2 may be constant or can continuously be varied. It is desirable that a boundary portion between the center portion and the peripheral portion is smoothly connected by a circular arc etc., so as to prevent stress concentration when the first ring is pressed.

Although the degrees of bulging-out of the center portion and the peripheral portions of the saddle surface can be represented by curvatures as in the case of the third aspect of the invention if the shape in the width direction is a circular arc, the degrees can be represented by inclination angles toward the bulging-out direction if the bulging-out of the saddle surface consists of a plurality of straight lines as in the case of a trapezoidal shape, for example. Therefore, making the degree of bulging-out of the center portion smaller relative to the degree of bulging-out of the peripheral portions means that the inclination angle of the central portion is made smaller than the inclination angle of the peripheral portions and, for example, an inclination angle=0 degrees is the same as the degree of bulging-out that is zero and has the same meaning as the curvature radius Rs1 of the center portion=∞.

In the second aspect of the present invention, a gap may not necessarily definitely be formed in the center portion of the saddle surface, and the inner circumferential surface of the first ring may substantially contact the center portion.

Although a plurality of the rings of the hoop are formed into a curved shape with a center portion in the width direction bulging out toward the outside in a manner corresponding to the shape of the saddle surface and are curved with a curvature smaller than, for example, the curvature of the peripheral portions of the saddle surface of the third aspect of the invention in a natural state, a plurality of the rings can be curved with substantially the same curvature as the curvature of the peripheral portions of the saddle surface or curved with a curvature greater than the curvature of the peripheral portions of the saddle surface.

First Embodiment

An embodiment of the present invention will now be described in detail with reference to the drawings.

Figure 1:
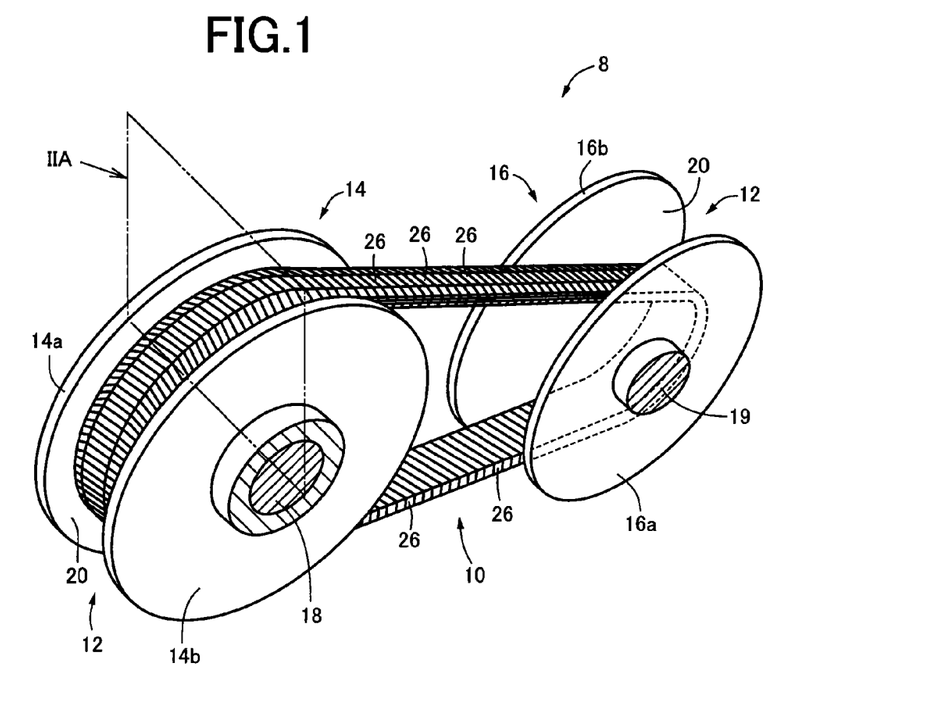
FIG. 1 is a perspective view of a belt-type continuously variable transmission for a vehicle to which the present invention is preferably applied.
Figure 2A:
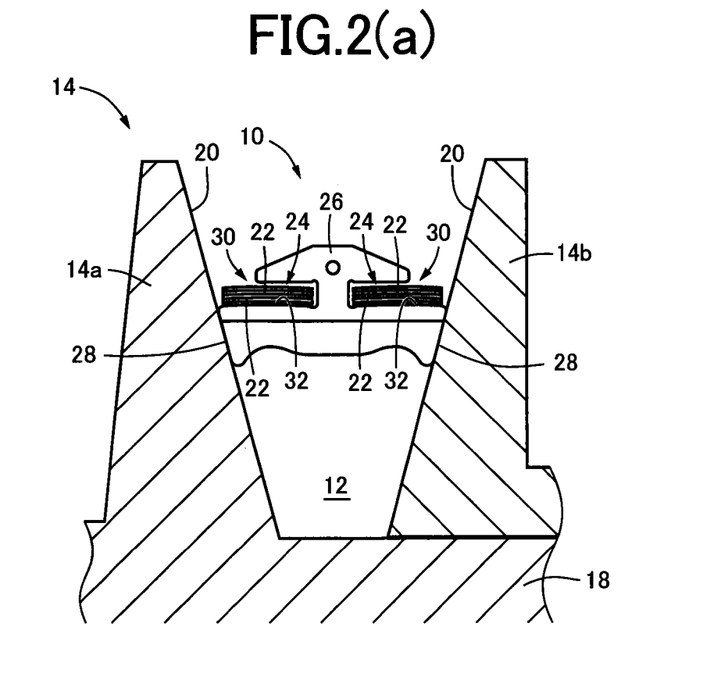
FIG. 2(a) is an enlarged view of a cross section of an arrow view portion taken along IIA of FIG. 1.
Figure 2B:
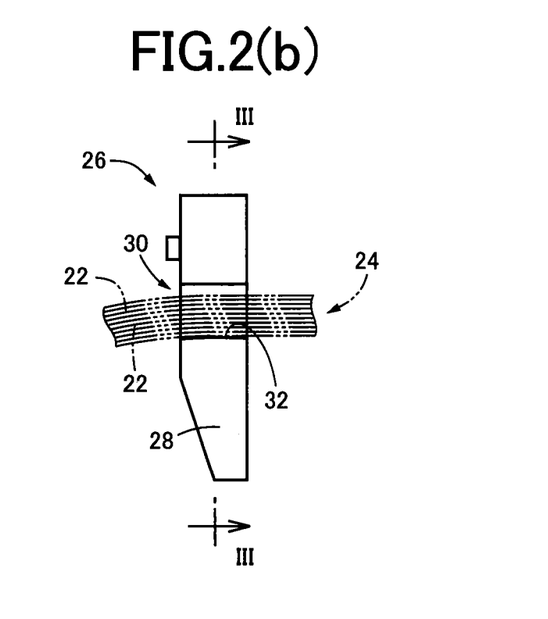
FIG. 2(b) is an enlarged view of a right side surface of an element of FIG. 2(a).

FIG. 1 is a perspective view of a belt-type continuously variable transmission 8 for a vehicle to which the present invention is preferably applied; FIG. 2(a) is an enlarged view of a cross section of an arrow view portion taken along IIA of FIG. 1; and FIG. 2(b) is an enlarged view of a right side surface of one element 26 of (a). The belt-type continuously variable transmission 8 includes a pair of pulleys 14, 16 having V-grooves 12 with variable groove widths in outer peripheral portions and rotatably disposed around shaft centers parallel with each other, and a transmission belt 10 is wound across the pulleys 14, 16. The pulleys 14, 16 respectively include fixed rotating bodies 14a, 16a fixed to rotating shafts 18, 19, and movable rotating bodies 14b, 16b disposed movably in the axial direction relative to the rotating shafts 18, 19. Conically-shaped sheave surfaces 20 having relative distances in the axial direction increased toward the outside in the radial direction are disposed on opposing surfaces of the fixed rotating body 14a and the movable rotating body 14b and on opposing surfaces of the fixed rotating body 16a and the movable rotating body 16b. Each of the V-grooves 12 is formed by a pair of the opposing sheave surfaces 20.

The transmission belt 10 includes a pair of endless annular hoops 24 formed by overlapping a plurality of flexible thin strip-shaped rings 22, and a multiplicity of elements 26 made of plate-shaped metal supported by the pair of the hoops 24 and annularly arranged in the thickness direction along the pair of the hoops 24. The rings 22 are high-tensile steel plates having a thickness on the order of 0.2 mm, for example, formed into a ring shape and are overlapped into, for example, about nine layers from the inside to the outside. The elements 26 are thick plate-shaped pieces formed by punching out a steel plate having a thickness on the order of 1.8 mm, for example, and about 400 elements are included in this embodiment, for example. The element 26 includes a pair of contact surfaces 28 respectively facing and contacting a pair of the sheave surfaces 20 on the both side portions as depicted in FIG. 2(a) and has a pair of recessed grooves 30 symmetrically disposed to be opened laterally on the both side portions and, when the hoops 24 are respectively received in the recessed grooves 30, a multiplicity of the elements 26 are supported in an annularly arranged state by the pair of the hoops 24.

Figure 3A:
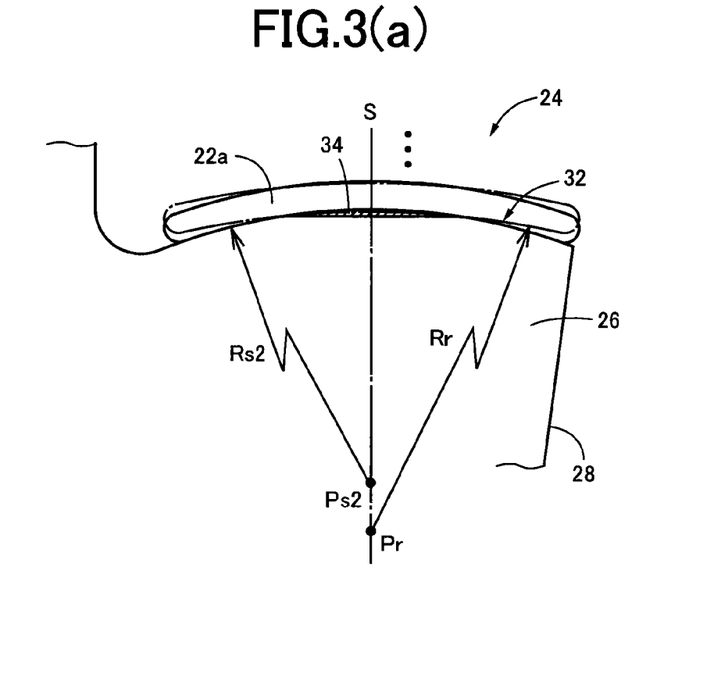
FIG. 3(a) is a cross-sectional view of an engagement state of the saddle surface and the first ring.
Figure 3B:
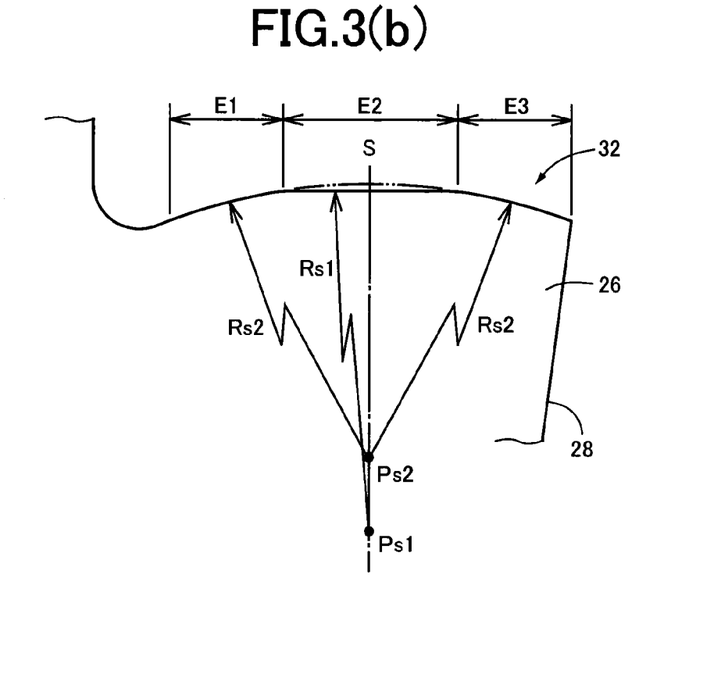
FIG. 3(b) is a cross-sectional view without the hoop for explaining the shape of the saddle surface, depicting the cross-section view taken along III-III of FIG. 2(b).

The transmission belt 10 is wound around a pair of the pulleys 14 and 16 and rotated in a circumferential direction to transmit power between the pulleys 14 and 16. In this case, in the portions wound around the pulleys 14, 16, i.e., in the areas where the contact surfaces 28 of the elements 26 are brought into contact with the sheave surfaces 20, the hoops 24 are pressed with a tension against the saddle surfaces 32 that are wall surfaces on the inner circumferential side of the recessed grooves 30, and the shape in the width direction of the hoops 24 is elastically deformed in accordance with the shape of the saddle surfaces 32. FIG. 3(a) is a cross-sectional view of an engagement state of a first ring 22a located at the innermost circumference of the hoop 24 and the saddle surface 32, depicting an enlarged view of one (right side) of a pair of the hoops 24 in the cross-section taken along of FIG. 2(b). FIG. 3(b) is a cross-sectional view without the hoop 24 for explaining the shape of the saddle surface 32. Since both FIGS. 3(a) and 3(b) wholly depict cross-sections, hatching (diagonal lines) indicative of a cross-section is not depicted. The same applies to FIGS. 4 to 6 described later.

As depicted in FIG. 3(b), the saddle surface 32 is divided into a center portion E2 located substantially the center in the width direction (horizontal direction of FIG. 3(b)) and peripheral portions E1 and E3 located on the both sides of the center portion E2. A curved shape is formed as a whole with the center portion E2 gently bulging out into a protruded shape toward the outside, i.e., the outer circumferential side (upside of FIG. 3(b)) and the curvature of the center portion E2 is made smaller than the curvature of the peripheral portions E1, E3 on the both sides. Specifically, the peripheral portions E1, E3 form a circular arc shape gently bulging out with the common constant curvature radius Rs2 around a curvature center Ps2 on a center line S defined at substantially the center in the width direction, and the center portion E2 is formed with a curvature radius Rs1 greater than the curvature radius Rs2 around a curvature center Ps1 on the center line S as well. In this embodiment, since Rs1=∞ (infinity) is satisfied and the degree of bulging-out is zero, the center portion E2 forms a linear shape in the width direction. A dashed-two dotted line depicted in the center portion E2 forms a circular arc of the curvature radius Rs2 and the center portion E2 has a recessed shape relative to the circular arc of the curvature radius Rs2. The curvature radius Rs2 is the same degree as a curvature radius Rs of a saddle surface of a conventional technology of FIG. 6, for example, and is appropriately set. Each of the boundary portions between the center portion E2 and the peripheral portions E1, E3 is smoothly connected by a circular arc etc.

On the other hand, the first ring 22a forms a curved shape (circular arc shape) with a center portion gently bulging out into a protruded shape toward the outside with a curvature radius Rr greater than the curvature radius Rs2 as indicated by a dashed-dotted line of FIG. 3(a) in a natural state; however, in a pressed state while portions wound around the pulleys 14, 16 are pressed against the saddle surface 32 by tension, the both side portions in the width direction are elastically deformed in accordance with the curved shape of the peripheral portions E1, E3 of the saddle surface 32 as indicated by a solid line, and the first ring 22a is turned to a curved shape with the center portion in the width direction gently bulging out as a whole. The curved shape in this case is the circular arc shape of substantially the same curvature radius as the curvature radius Rs2 of the peripheral portions E1, E3 of the saddle surface 32. When the inner circumferential surface of the first ring 22a is turned to the circular arc shape of substantially the same curvature radius as the curvature radius Rs2, the both side portions in the width direction are respectively brought into close contact with the peripheral portions E1, E3 of the saddle surface 32; however, a predetermined gap (shaded portion) 34 is formed in the center portion due to a difference from the curvature radius Rs1 of the center portion E2 of the saddle surface 32 and the gap 34 retains lubrication oil.

As described above, in the transmission belt 10 of this embodiment, since the saddle surface 32 is curved as a whole such that the center portion E2 in the width direction bulges out, and the curvature (degree of bulging-out) of the center portion E2 is set smaller than the curvature of the peripheral portions E1, E3 (Rs2<Rs1), in the pressed state while the inner circumferential surface of the first ring 22a is pressed against the saddle surface 32, the both side portions in the width direction of the first ring 22a are elastically deformed to be in close contact with the peripheral portions E1, E3 of the saddle surface 32 such that a curved shape is formed with the center portion in the width direction bulging out as a whole, and the curvature of the center portion is made larger than the curvature of the center portion E2 of the saddle surface 32. Since the gap 34 is formed in the center portion between the inner circumferential surface of the first ring 22a and the saddle surface 32 due to the difference in curvature of the center portion, the gap 34 retains the lubrication oil and the lubrication performance in the center portion is improved, thereby suppressing abrasion and seizure. As a result, the durability of the transmission belt 10 is improved or an amount of the supplied lubrication oil can be reduced, thereby reducing the performance necessary for an oil pump and improving the efficiency.

Although a pressing load is increased as compared to the conventional case in the peripheral portions E1, E3 other than the central portion E2 in which the gap 34 is formed, since the first ring 22a is substantially uniformly brought into close contact with the saddle surface 32 due to the elastic deformation in the peripheral portions E1, E3 and the load is broadly distributed, the load is not concentrated by point contact as in the case of the center portion (near the center line S) of the conventional apparatus depicted in FIG. 6 and, since the lubrication oil retained in the gap 34 of the center portion E2 favorably lubricates the peripheral portions E1 and E3, the lubrication performance is comprehensively improved, thereby suppressing abrasion and seizure.

In this embodiment, since the center portion E2 of the saddle surface 32 has the curvature radius Rs1 of ∞ to form a linear shape in the width direction, the relatively large gap 34 is formed from the inner circumferential surface of the first ring 22a and the gap 34 retains the lubrication oil, thereby achieving more favorable lubrication performance.

Second Embodiment

Another embodiment of the present invention will then be described. In the following embodiment, portions substantially equal to the embodiment described above are denoted by the same reference numerals and will not be described in detail.

Figure 4:
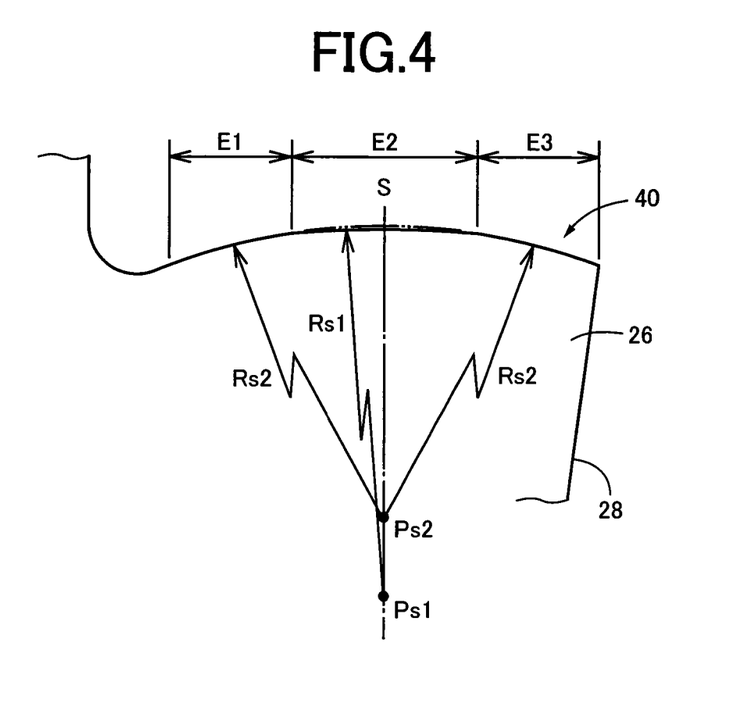
FIG. 4 is a cross-sectional view corresponding to FIG. 3(b) for explaining another embodiment of the present invention.

FIG. 4 is a cross-sectional view corresponding to FIG. 3(b) and a shape of a saddle surface 40 is different as compared to the first embodiment. Specifically, although the peripheral portions E1, E3 of the saddle surface 40 of the second embodiment form a circular arc shape gently bulging out with the common constant curvature radius Rs2 as is the case with the first embodiment, the curvature radius Rs1 of the center portion E2 is a finite value larger than the curvature radius Rs2 and the center portion E2 also forms a circular arc shape gently bulging out into a protruded shape toward the outside. Even in this case, since the first ring 22a pressed against the saddle surface 40 is elastically deformed into the circular arc shape of substantially the same curvature radius as the curvature radius Rs2 of the peripheral portions E1, E3 of the saddle surface 40, the predetermined gap 34 is formed in the center portion in the width direction due to a difference from the curvature radius Rs1 of the center portion E2 of the saddle surface 40 and the gap 34 favorably retains the lubrication oil, thereby achieving the same functional effect as the first embodiment.

In the second embodiment of FIG. 4, if the curvature radius Rs1 of the center portion E2 of the saddle surface 40 is relatively small and close to the curvature radius Rs2 of the peripheral portions E1 and E3, the center portion in the width direction of the first ring 22a also substantially contacts the saddle surface 40 and the definite gap 34 may not be formed therebetween. Even in this case, since the center portion E2 of the saddle surface 40 has the curvature radius Rs1 smaller than the curvature radius Rs2 of the peripheral portions E1, E3 and is recessed from the circular arc (dashed-two dotted line) of the curvature radius Rs2, the pressing load is reduced even if the gap 34 is not formed. Therefore, as compared to the conventional case of the load intensively acting on the center portion E2, the lubrication performance in the center portion E2 is improved, thereby suppressing abrasion and seizure. Although the pressing load is increased in the peripheral portions E1, E3 other than the central portion E2, since the first ring 22a is substantially uniformly brought into close contact due to the elastic deformation in the peripheral portions E1, E3 and the load is broadly distributed, the action of the load is not concentrated as in the conventional center portion and predetermined lubrication performance is acquired in the peripheral portions E1, E3, thereby comprehensively improving the lubrication performance as compared to the conventional case.

Third Embodiment

Figure 5A:
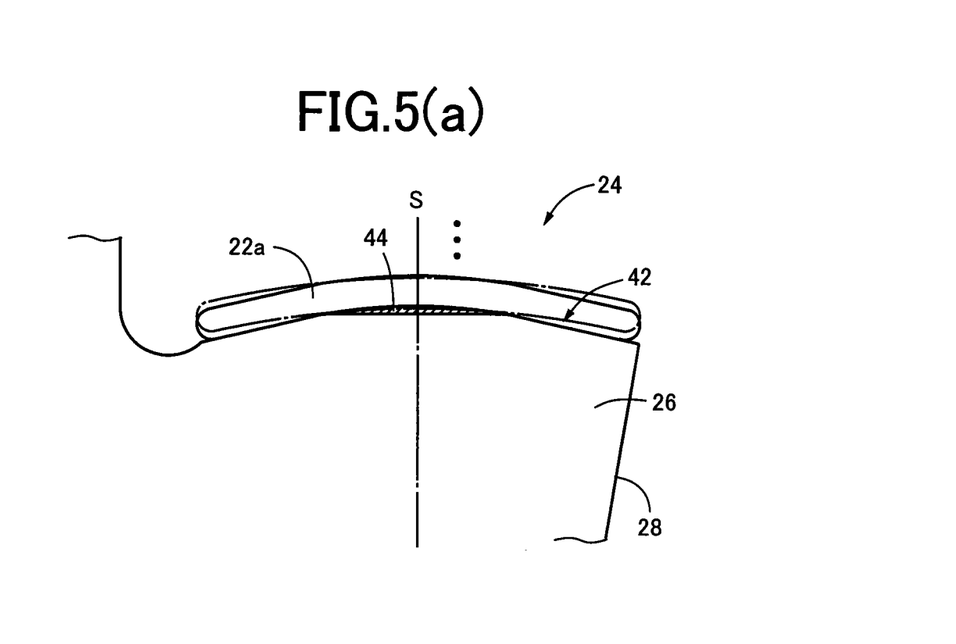
FIGS. 5(a) and 5(b) are cross-sectional views corresponding to FIGS. 3(a) and 3(b) for explaining further another embodiment of the present invention.
Figure 5B:
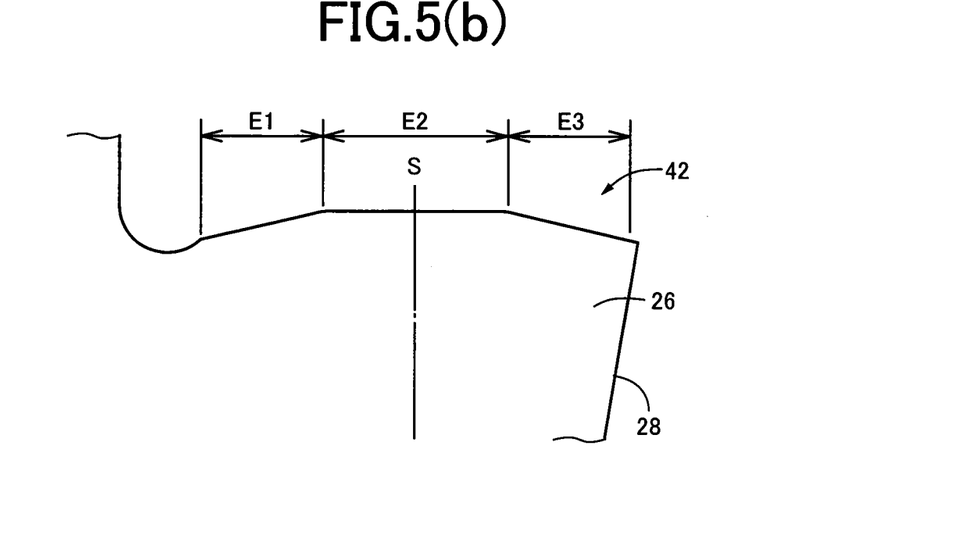

FIGS. 5(a) and 5(b) are cross-sectional views corresponding to FIGS. 3(a) and 3(b), respectively, and a shape of a saddle surface 42 is different as compared to the first embodiment. Specifically, although the saddle surface 42 of the third embodiment is the same as the first embodiment in that a curved shape is formed as a whole with the center portion E2 gently bulging out into a protruded shape toward the outside, i.e., the outer circumferential side (upside of FIG. 5(b)), the saddle surface 42 is different in that each of the center portion E2 and the peripheral portions E1, E3 is formed by a straight line to form a trapezoidal shape as a whole. Even in this embodiment, in the pressed state while the inner circumferential surface of the first ring 22a is pressed against the saddle surface 42, the both side portions of the first ring 22a are elastically deformed to be in close contact with the peripheral portions E1, E3 of the saddle surface 42 such that a curved shape is formed with the center portion in the width direction bulging out as a whole as depicted with solid lines in FIG. 5(a) and, therefore, a gap 44 is formed in the center portion as is the case with the first embodiment so that the lubrication oil is retained, thereby achieving the same functional effect as the first embodiment. Each of the boundary portions between the center portion E2 and the peripheral portions E1, E3 of the saddle surface 42 is smoothly connected by a circular arc etc. The saddle surface 42 can be divided into four or more parts connected like a polygonal line so as to form a gently bulging curved shape.

Fourth Embodiment

Although the embodiments of the present invention have been described in detail with reference to the drawings, the above are merely exemplary embodiments and the present invention can be implemented in variously modified and improved forms based on the knowledge of those skilled in the art.

NOMENCLATURE OF ELEMENTS

10: transmission belt 14, 16: pulley 22: ring 22a: first ring 24: hoop 26: element 32, 40, 42: saddle surface 34, 44: gap E1, E3: peripheral portion E2: center portion.

The invention claimed is:

1. A transmission belt comprising:
an endless annular hoop formed by overlapping a plurality of thin strip-shaped rings; and
a multiplicity of elements supported by the hoop in an annularly arranged state along the hoop, the elements including a saddle surface pressed against an inner circumferential surface of a first ring located at the innermost circumference of the hoop,
the transmission belt wound around a plurality of pulleys to transmit power and having a shape in the width direction of the first ring elastically deformed in accordance with the saddle surface in a pressed state while the inner circumferential surface of the first ring is pressed against the saddle surface by tension at portions wound around the pulleys, wherein
the saddle surface is curved as a whole such that a center portion bulges out in the width direction,
the first ring is formed with a center portion bulging out in the width direction in a natural state, and when both side portions in the width direction are brought into close contact with peripheral portions on both sides of the saddle surface in a pressed state, the first ring is brought into a curved shape as a whole such that a center portion bulges out in the width direction in accordance with the shapes of the peripheral portions,
a degree of bulging-out of the center portion of the saddle surface is smaller than a degree of bulging-out of the peripheral portions, so that the pressing load against the saddle surface is reduced in the center portion in the width direction of the first ring or a gap is formed between the first ring brought into the curved shape and the saddle surface in the center portion in the width direction of the first ring, and
the degree of bulging-out of the center portion of the saddle surface is zero and forms a linear shape in the width direction.

2. The transmission belt of claim 1, wherein
the peripheral portions of the saddle surface are curved at a predetermined curvature, and wherein the center portion has a curvature smaller than the curvature of the peripheral portions.

3. The transmission belt of claim 1, wherein
a gap is formed between the first ring and the saddle surface in the center portion in the width direction.

4. The transmission belt of claim 2, wherein
a gap is formed between the first ring and the saddle surface in the center portion in the width direction.

* * * * *